United States Patent [19]

Schmidt

[11] Patent Number: 5,360,333
[45] Date of Patent: Nov. 1, 1994

[54] BAND HEATER CLAMP ARRANGEMENT FOR AN INJECTION MOLDING MACHINE

[75] Inventor: Harald Schmidt, Georgetown, Canada

[73] Assignee: Husky Injection Molding Systems Ltd., Bolton, Canada

[21] Appl. No.: 954,322

[22] Filed: Sep. 30, 1992

[51] Int. Cl.$^5$ .............................................. B29C 45/23
[52] U.S. Cl. ................... 425/549; 264/328.15; 425/564; 425/566
[58] Field of Search ............... 425/549, 562, 563, 564, 425/565, 566; 264/328.15

[56] References Cited

U.S. PATENT DOCUMENTS

| | | | |
|---|---|---|---|
| 4,132,578 | 1/1979 | Gell, Jr. ............................... | 156/158 |
| 4,268,241 | 5/1981 | Rees et al. ............................ | 425/549 |
| 5,052,100 | 10/1991 | Trakas ................................. | 425/549 |

FOREIGN PATENT DOCUMENTS 0444748 2/1991 European Pat. Off. .
1290012 2/1969 United Kingdom .

OTHER PUBLICATIONS

Mold-Making Handbook, 1983, Chapter 19, p. 1.
Plastics Mold Engineering Handbook, 1978, pp. 123–127.
Page 24 of the Husky Hot Runner Manual Published by Husky Husky Injection Molding Systems Ltd.
Advertisement, Published in the Jun. 1992 Edition of Modern Plastics, p. 136.

*Primary Examiner*—Tim Heitbrink
*Attorney, Agent, or Firm*—Bachman & Lapointe

[57] ABSTRACT

The present invention relates to a bi-metallic clamping system for holding a heater firmly on the external surface of a hot runner nozzle body. The band heater-clamp arrangement of the present invention is formed by a cylindrical sheath which houses the heater coil. The sheath has an inner sleeve formed from a material having a relatively high thermal expansion and an outer sleeve formed from a material having a relatively low thermal expansion. The heater coil is positioned between the two sleeves. The desired clamping effect is produced by providing at least one axial slot in the inner sleeve. It has been found that during heating, the outer sleeve expands less than the inner sleeve due to the differences in the thermal expansion coefficients of the materials used to form the sleeves. This produces radial forces in the inner sleeve that are redirected into circumferential forces by the axial slot. These circumferential forces in turn cause the slot to close and thereby achieve the desired clamping effect. The band heater-clamp arrangement of the present invention has utility in injection molding machines having hot runner systems for providing liquified plastic material from a source to an injection gate.

14 Claims, 1 Drawing Sheet

BAND HEATER CLAMP ARRANGEMENT FOR AN INJECTION MOLDING MACHINE

BACKGROUND OF THE INVENTION

The present invention relates to an injection-molding machine of the hot runner type and, more particularly, to a bimetallic clamp arrangement for securing a heater element in a desired position around a nozzle body for feeding liquified materials such as plastic, metal, etc. to an injection gate of a mold cavity.

To maintain the fluidity of the oncoming plastic material during closure of the injection gate, enabling its use in a following molding cycle, it is desirable to form a terminal part of the sprue channel as an axial bore of a nozzle of good thermal conductivity closely surrounded by an electrical heating element. Some nozzle manufacturers go through costly processes to integrate heaters into the nozzle body. The primary disadvantage with this approach however is that should the heater get damaged the nozzle is lost as well. Thus, it is preferred that the heating element be removably mounted onto the nozzle body for ready replacement. One of the primary challenges associated with this technique is holding the heating element firmly against the external surface of the hot runner nozzle housing so as to maximize heater performance and provide precise temperature control.

A variety of different approaches have been used to clamp heating elements to a nozzle body. One approach includes a clamping arrangement that mechanically presses the heater onto the nozzle body. An example of one such mechanical clamping arrangement is illustrated in U.S. Pat. No. 4,268,241 to Reese et al. As shown therein, an annular heater is held in position against a shoulder or tapering surface portion of the nozzle body by a nut threaded onto a gate-side extremity of the nozzle body.

Still other mechanical press type approaches include the heater band constructions shown on page 24 of the Husky Hot Runner Manual published by Husky Injection Molding Systems, Ltd. and in an advertisement for an axial clamp band heater published in the June 1992 edition of *Modern Plastics*, page 136. The axial clamp band heater shown in the advertisement differs from the more traditional heater band construction shown in the manual in that the clamping screw is aligned with the longitudinal axis of the heater and is not perpendicular to it as in the conventional construction. The axial clamp band heater has the advantage over the conventional construction of taking up less space since a large clearance is not needed for access to the screw.

The principal disadvantages of these mechanical press type approaches have been the cumbersome nature of the clamp assembly and the need to machine a pocket for the clamp screw. Still another disadvantage seen with these approaches is the uneven axial temperature distribution of the heaters. Typically, the heater coil has no profiled wattage. The heat demand of the hot runner nozzle is at the tip and the locator is different as it is at the center of the shaft. To achieve isothermal conditions and to improve the nozzle temperature profile, heat should be generated only where it is needed.

Still another approach for securing a heater to a nozzle body is exemplified by the D-M-E Gate-Mate Hot Sprue Bushing. This approach uses an external heater wrapped around the nozzle housing without any apparent clamping means. It is believed that this device stays in place by friction. By manually uncoiling the heater when it is slid over the housing, its internal diameter increases sufficiently to allow it to slide on. When released the coiling action of the heater causes a gripping of the housing or nozzle body. The primary disadvantages to this approach are that the heater is easily damaged and the absence of a firm grip which allows the heater to move or slip.

Accordingly, it is an object of the present invention to provide an improved band heater-clamp arrangement for securing an external heater to a nozzle body. It is a further object of the present invention to provide a band heater-clamp arrangement as above which has a compact design and a simple construction.

It is still a further object of the present invention to provide a band heater-clamp arrangement as above that is easy to install and to maintain.

It is yet a further object of the present invention to provide a band heater-clamp arrangement as above which has improved reliability and provides an improved heat profile.

Still other objects and advantages to the band heater-clamp arrangement of the present invention will become more apparent from the following description and drawings wherein like reference numerals depict like elements.

SUMMARY OF THE INVENTION

The foregoing objects are attained by the improved band heater-clamp arrangement of the present invention. In accordance with the present invention, the improved heater-clamp arrangement of the present invention comprises a bi-metallic clamping system for holding a heater firmly against an external surface of a hot runner nozzle housing or body. The bi-metallic clamping system is formed by a cylindrical, coaxial tube heater sheath having a cylindrical inner sleeve, a cylindrical outer sleeve, and a heater coil positioned between a surface of the inner sleeve and an inner surface of the outer sleeve. The inner and outer sleeves are preferably formed from materials having different coefficients of thermal expansion with the material forming the inner sleeve having a higher thermal expansion than the material forming the outer sleeve. The inner sleeve also has an axial slot which extends substantially its entire length.

When heated by the heater coil, the inner sleeve expands more than the outer sleeve. As a result, radial forces will be generated in the inner sleeve. The axial slot redirects these radial forces into circumferential forces that provide the desired clamping effect. This occurs because the less expanding outer sleeve hinders the more expanding inner sleeve from growing in diameter and forces the axial slot in the inner sleeve to close as the temperature rises. When the temperature reaches equilibrium, the heater generates its own solid grip onto the nozzle body. When the heat supply is cut off, the heat expansion retracts and the heater sleeve relaxes allowing it to be removed from the nozzle body.

In an injection molding machine, the heater sleeve of the present invention is placed around a portion of the nozzle body defining a part of the channel for conveying liquified plastic material from a source to an injection gate of a mold plate.

Other details and advantages to the present invention will be discussed in the following description.

DETAILED DESCRIPTION

Figure 1:
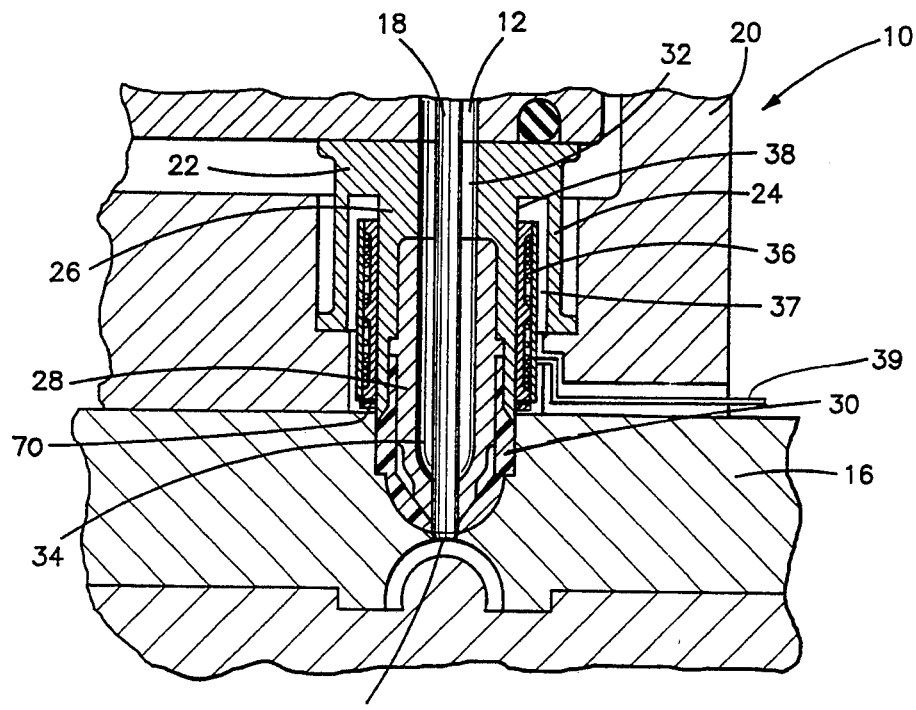
FIG. 1 is a cross sectional view of the nozzle portion of an injection molding machine having a hot-runner structure.

Referring now to the figures, FIG. 1 illustrates part of a hot runner structure 10 serving to supply liquified thermoplastic resin from a pressure chamber (not shown) via a channel 12 to an injection gate 14 of a mold plate 16. The gate 14 is alternately opened and closed by a rod or pin 18 connected to a double-acting piston (not shown). The piston for operating the rod or pin does not form part of the present invention and may be any suitable piston known in the art for actuating such a valve rod.

A cooled intermediate or backing plate 20 is inserted between the mold plate 16 and the hot runner structure 10. The backing plate 20 supports a nozzle 22 provided with an annular skirt 24 surrounding a tubular nozzle body 26. The nozzle 22 including the skirt portion 24 and the nozzle body portion 26 is formed from a material having good thermal conductivity. The tubular nozzle body 26 forms part of the hot runner system for supplying liquified plastic material to the injection gate 14. A nozzle tip 28 formed from a highly heat-conductive material, such as beryllium/copper, is seated in the nozzle body 26 and extends into the mold plate 16 as a guide for the free end of the valve rod 18. An annular space existing between the end of the nozzle body 26, the tip 28 and the mold plate 16 is occupied by a sheath 30 of resinous material. This sheath may be prefabricated or may be formed from the overflow of injected resin in the first operating cycle or cycles. The sheath 30 serves primarily as a thermal insulator.

As shown in FIG. 1, the tubular body 26 has an axial channel 32 which forms part of the channel 12 through which plastic material is conveyed from the source (not shown) to the gate 14. The tip 28 also has a channel 34 that forms part of the channel 12 for conveying the plastic material to the gate 14.

When the gate 14 is closed by the rod 18, plastic material will reside in the channels 32 and 34. To keep this plastic material in a liquified state, a heater 36 is provided around a portion of the nozzle body 26. The heater 36 is positioned within a space 37 defined by the skirt 24, the backing plate 20 and the nozzle body 26 and is in contact with the outer surface 38 of the nozzle body 26. An electrical cable 39 passes through a passageway in the backing plate and is connected to the heater 36 so that electrical power may be provided thereto.

Figures 2, 3:
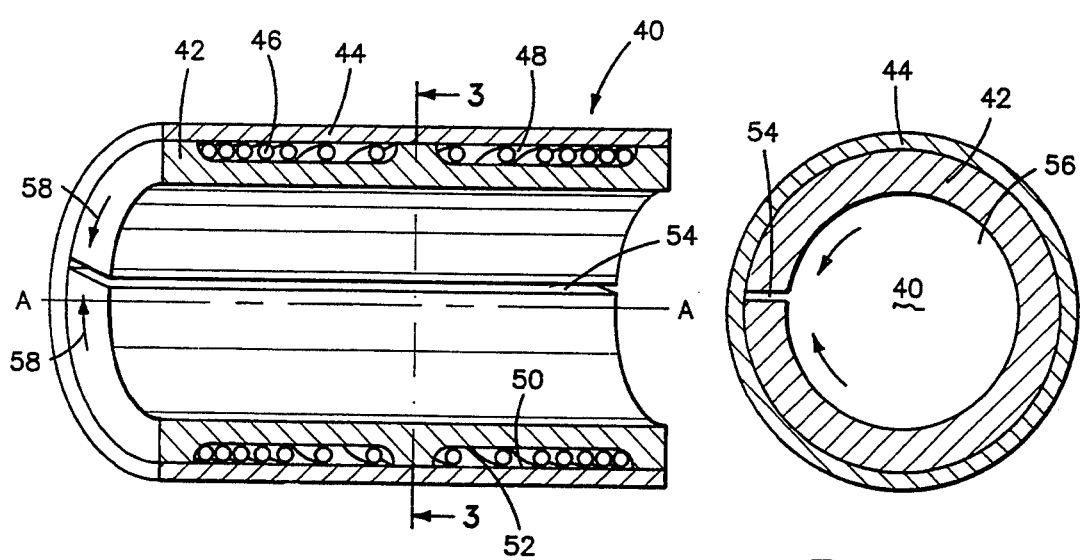
FIG. 2 is a cross sectional view of the band heater-clamp arrangement of the present invention.
FIG. 3 is a cross sectional view of the band heater-clamp arrangement of the present invention taken along lines 3—3.

FIGS. 2 and 3 illustrate a band heater-clamp arrangement 40 in accordance with the present invention which may be used as the heater 36. The band heater-clamp arrangement 40 as shown therein is a hi-metallic clamping system for holding a heater coil firmly on an external surface of the hot runner nozzle body 26. The bi-metallic clamping system is formed by a cylindrical body or heater sheath comprising a coaxial tube assembly with a cylindrical inner sleeve 42 formed from a high conductivity material, typically aluminum, a cylindrical outer sleeve 44 formed from a low conductivity material, typically titanium, and a heater coil 46 positioned between the two sleeves. The sleeves 42 and 44 are coextensive with each other. Preferably, the heater coil 46 is positioned in one or more spaces 48 machined into the outer periphery of the inner sleeve 42 so that it is between an inner surface 50 of the outer sleeve and surface(s) 52 of the inner sleeve. An opening (not shown) is provided in the outer sleeve 44 so an electrical connection between the cable 39 and the coil 46 can be made.

The inner sleeve 42 is formed from a material having a relatively high thermal expansion. Preferably, the inner sleeve 42 is formed from a material selected from the group consisting of copper, copper alloys, aluminum, and aluminum alloys.

The outer sleeve 44, on the other hand, is formed from a material having a relatively low thermal expansion. Preferably, it is formed from a material selected from the group consisting of titanium, titanium alloys, stainless steels, and iron alloys.

As can be seen from the figures, the inner sleeve 42 in its relaxed state has a central bore 56 with a diameter substantially equal to the outer diameter of the tubular nozzle body 26. When heated, the inner sleeve 42 will expand more than the outer sleeve 44 due to the difference in thermal expansion properties. Radial forces will be generated in the inner sleeve as the less expanding outer sleeve hinders the more expanding inner sleeve from growing in diameter.

An axial slot 54 is provided in the inner sleeve to redirect these radial forces into circumferential forces that cause the inner sleeve to reduce its internal diameter and to grip or clamp the body 26 which it surrounds. Since the outer sleeve hinders expansion of the inner sleeve, the circumferential forces 58 will force the slot 54 to close as the temperature rises and cause the desired clamping effect. In the clamping position, the inner sleeve 42 will be in direct contact with the external surface 38 of the nozzle body 26.

As can be seen from FIGS. 2 and 3, the axial slot 54 preferably extends in a direction substantially parallel to the longitudinal axis A—A of sleeve 42 and for an extent which is substantially equal to the length of the sleeve 42. The slot 54 also preferably has a thickness substantially equal to the thickness of the sleeve 42. The width of the slot 54 depends upon the diameter of the heater coil 46. Typically, the slot 54 is from about 1 to about 2 mm wide.

When the temperature reaches equilibrium, the heater generates its own solid grip onto the nozzle body 26 as a result of the aforementioned differences in the thermal expansion properties.

When the heat supply is cut off, the heat expansion is reversed and the clamping effect is reduced as the slot 56 opens up. When relaxed, the band heater-clamp arrangement 40 may be removed from the nozzle body 26. A spring washer 70 is preferably provided to prevent the heater-clamp arrangement from sliding off the nozzel body 26 when cold.

The construction of the inner sleeve is advantageous in that it permits a profiled wattage to be generated. This is accomplished by varying the pitch between the heater coils positioned within the spaces 48. The profiled wattage effect is heightened by the design of the present invention because the inner sleeve also has a relatively high thermal conductivity and carries the profiled heater coil.

The inner sleeve design is also advantageous in that it allows heat generated by the heater coil to be transferred in an axial direction. This means, for long nozzle bodies, that one long heater can replace several short heaters. Alternatively for very long heaters several heater coils (multiple circuits) could be housed inside one clamp assembly.

If desired, a thermocouple (not shown) could be incorporated into the heater assembly.

The design of the heater-clamp arrangement of the present invention is advantageous in that it is compact. The heater-clamp arrangement is made of relatively simple components which are easy to maintain and which should provide excellent durability and corrosion resistance. Still further, the heater-clamp arrangement is easy to install. The heater-clamp arrangement of the present invention avoids the use of mechanical clamp devices to achieve the desired clamping effect. It is believed that the performance of the heater-clamp arrangement is better than other heater systems because there is excellent contact between the heater sleeve with the heater coil and the nozzle body which it surrounds. If desired, the inner surface of the outer shield could be polished to reflect more heat inwardly. Since this heater has a very low mass and a very fast thermal response it can heat up or cool down very quickly when compared to the cast copper style of internal coil heaters which are very slow to cool down. Thus, control is more responsive and accurate and there is less risk of overheating and degrading the resin.

While the inner sleeve of the heater-clamp arrangement has been shown with a single axial slot, it should be recognized that it may have more than one axial slot if desired. In such a case, the slot(s) do not have to extend the entire length of the sleeve.

It is apparent that there has been provided in accordance with this invention a band heater clamp arrangement which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding machine including a hot-runner structure having a channel for conveying liquified plastic material to an injection gate of a mold plate, said molding machine comprising:

a tubular body formed from a material having a good thermal conductivity forming a part of said channel;

heater means surrounding a portion of said tubular body for maintaining plastic material in a liquified state within said part of said channel formed by said tubular body;

said heater means comprising a heater sheath formed by an inner sleeve and an outer sleeve and a heater coil;

said inner and outer sleeves having abutting portions and non-abutting portions which define a cavity in which said heater coil is positioned; and said inner sleeve being formed from a different material than said outer sleeve so that said inner sleeve expands more than said outer sleeve when said sleeves are heated, whereby said greater expansion of said inner sleeve creates forces which cause said heater sheath to solidly grip said tubular body.

2. The injection molding machine of claim 1 wherein said heater sheath has an inner sleeve formed from a first thermal expansion material and an outer sleeve formed from a second thermal expansion material.

3. The injection molding machine of claim 2 wherein said inner sleeve is formed from a metal selected from the group consisting of copper, copper alloys, aluminum, and aluminum alloys and said outer sleeve is formed from a metal selected from the group consisting of titanium, titanium alloys, iron alloys, stainless steels.

4. The injection molding machine of claim 1 wherein said inner sleeve is in contact with an external surface of said tubular body.

5. The injection molding machine of claim 1 wherein said inner sleeve has at least one space machined in its outer periphery for accommodating said heater coil.

6. The injection molding machine of claim 1 wherein said heater coil and said inner sleeve provide a profiled wattage.

7. The injection molding machine of claim 1 wherein said outer sleeve has a reflective inner surface to reflect heat inwardly.

8. An injection molding machine including a hot-runner structure having a channel for conveying liquified plastic material to an injection gate of a mold plate, said molding machine comprising:

a tubular body formed from a material having a good thermal conductivity forming a part of said channel and heater means surrounding a portion of said tubular body for maintaining plastic material in a liquified state within said part of said channel formed by said tubular body;

said heater means comprising a heater sheath and a heater coil located within a cavity formed in said heater sheath;

said heater sheath comprising a coaxial tube assembly having a bimetallic construction;

said heater sheath having an inner sleeve formed from a material having a first thermal expansion and an outer sleeve formed from a material having a second thermal expansion; and said inner sleeve having a longitudinal axis and at least one axial slot which extends substantially parallel to said longitudinal axis, said at least one axial slot redirecting radial forces generated by said inner sleeve into circumferential forces so as to obtain clamping of said heater sheath to said tubular body.

9. An improved heater-clamp arrangement for use in an injection molding machine, said heater-clamp arrangement comprising:

a cylindrical body having a cylindrical inner sleeve and a cylindrical outer sleeve;

said inner sleeve being formed from a different material than said outer sleeve;

said inner sleeve being formed from a material having a first thermal expansion;

said outer sleeve being formed from a material having a second thermal expansion, said first thermal expansion being greater than said second thermal expansion so that said inner sleeve expands more than said outer sleeve when said sleeves are heated;

a heater coil positioned within at least one space, said space being machined into said inner sleeve and being located between a first surface of said inner sleeve and an inner surface of said outer sleeve; and said greater expansion of said inner sleeve creating a desired clamping force.

10. An improved heater-clamp arrangement for use in an injection molding machine, said heater-clamp arrangement comprising:

a cylindrical body having a cylindrical inner sleeve and a cylindrical outer sleeve;

said inner sleeve being formed from a material having a first thermal expansion;

said outer sleeve being formed from a material having a second thermal expansion;

a heater coil positioned between a first surface of said inner sleeve and an inner surface of said outer sleeve and said inner sleeve having an axial slot which extends along the length of the inner sleeve, said axial slot redirecting radial forces generated in said inner sleeve during heating into circumferential clamping forces for enabling clamping of said heater-clamp arrangement to another body.

11. The heater-clamp arrangement of claim 10 wherein said inner sleeve has a bore with a diameter substantially equal to an external diameter of a body about which said heater-clamp arrangement is to be positioned.

12. An improved heater-clamp arrangement comprising:

a cylindrical heater sheath;

a heating coil positioned within said sheath;

said heater sheath being formed by a cylindrical inner sleeve and a cylindrical outer sleeve; and said cylindrical inner sleeve having an axially extending slot which redirects radial forces generated in said inner sleeve during heating into circumferential clamping forces.

13. The improved heater-clamp arrangement of claim 12 wherein said inner and outer sleeves are substantially coextensive.

14. The improved heater-clamp arrangement of claim 12 wherein said sleeves are formed from materials with different thermal expansion coefficients and said material forming said inner sleeve has a thermal expansion coefficient greater than that of said material forming said outer sleeve.

* * * * *